Aug. 7, 1934.   W. M. FLEMING   1,968,999
STUFFING BOX
Filed Feb. 14, 1933
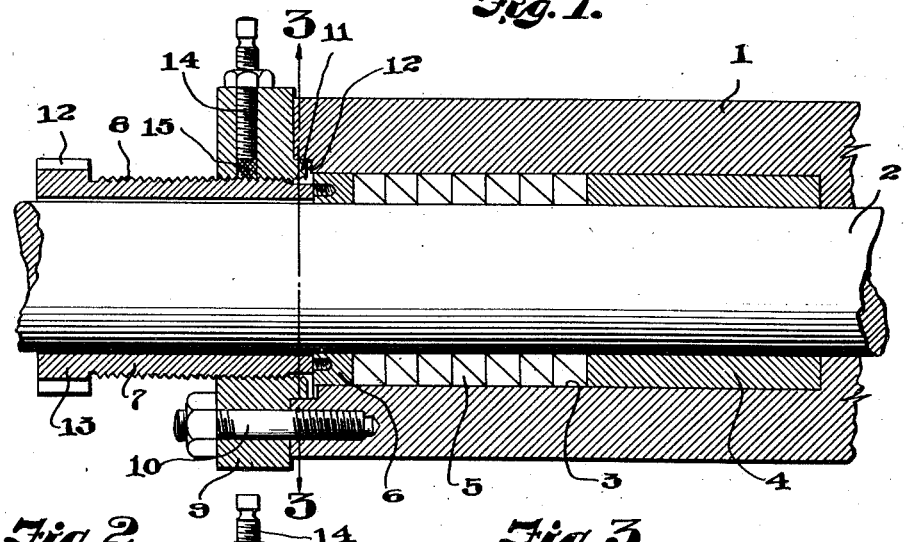
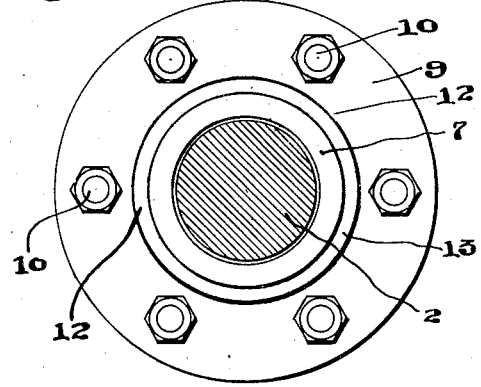
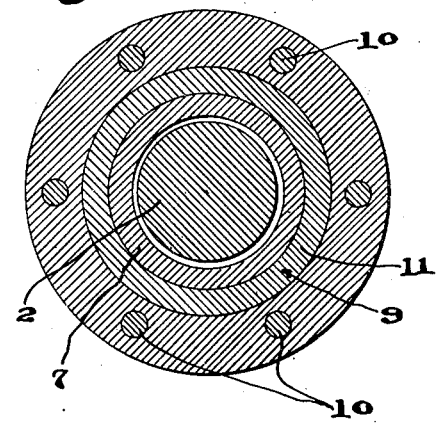
W. M. FLEMING.
INVENTOR
BY
ATTORNEY Patented Aug. 7, 1934

1,968,999

UNITED STATES PATENT OFFICE

1,968,999

STUFFING BOX

Wills M. Fleming, Holyoke, Mass., assignor to Worthington Pump and Machinery Corporation, New York, N. Y., a corporation of Virginia Application February 14, 1933, Serial No. 656,666

1 Claim. (Cl. 286—35)

This invention relates to stuffing boxes or packing structures for reciprocating or rotary rods or shafts, and an object of the invention is to provide a stuffing box structure which will prevent flexure of the gland studs, with consequent breakage, due to distortion under operating stresses, and one which is particularly adaptable for use on high pressure hydraulic pumps, such as hot oil pumps or the like. While with the standard approved type of stuffing box the gland studs are sufficiently strong to take the load, they cannot be made so as to stand repeated flexure without weakening or breakage.

Another object of the present invention is to provide a stuffing box structure so designed that it will be impossible to pull or tighten the gland studs unevenly on two sides of the glands, causing cocking of the gland which results in scoring of the rod or shaft.

With these and other objects in view, as may appear from the accompanying specification, the invention consists of various features of construction and combination of parts, which will be first described in connection with the accompanying drawing, showing a stuffing box of the preferred form embodying the invention, and the features forming the invention will be specifically pointed out in the claim.

In the drawing

Fig. 1 is a longitudinal section through the improved stuffing box.

Fig. 2 is an end view of the stuffing box.

Fig. 3 is a cross section through the stuffing box taken on the line 3—3 of Fig. 1.

Referring more particularly to the drawing, 1 indicates a pump casing or cylinder in which the rod or plunger 2 reciprocates. While in the drawing and the following specification, a reciprocatory rod is shown and described, it is to be understood that the improved stuffing box may be used in connection with rotary shafts where desirable, without departing from the spirit of the present invention.

The casing 1 is provided with a bore 3 about the rod or plunger 2 in which a spacing ring 4, a plurality of packing rings 5 and a follower ring 6 are mounted. The stuffing box structure proper includes the combination with the packing and follower ring 6 of the follower 7. The follower 7 is externally screw-threaded, as shown at 8, and extends through the gland 9. The gland 9 is attached to the casing or plunger 1 by suitable gland studs 10 and it has its inner face in flush engagement with the facing end of the casing or cylinder 1, so that it will be impossible to pull or tighten the various gland studs 10 unevenly and cause a cocking of the gland with a corresponding cocking of the follower 7 and the resultant scoring of the rod. The gland 9 has an annular flange 11 formed thereon which extends into an annular recess 12 formed in the cylinder 1 about the inner end of the bore 3, and the follower 8 engages the follower ring 6, to permit cramping of the packing 5. The follower 7 has wrench recesses 12 circumferentially spaced about the head 13 of the follower.

The follower 7 is locked in adjusted position with respect to the packing gland 9 by a locking screw 14 which extends transversely through the gland 9 and engages a soft metal contact member 15 which latter member is forced in locking engagement with the threads 8 of the follower 7.

From the foregoing description taken in connection with the accompanying drawing, it will be apparent that a stuffing box structure has been provided which is simple in construction, positive in action, one in which possible cocking of the gland is eliminated, one which will prevent flexure of the gland relative to the pump casing or cylinder under operating conditions, particularly the expansion and contraction of the cylinder under temperature variances, and one in which the follower may be quickly and easily adjusted for regulating the cramping of the packing, and locked in its proper adjusted position against accidental turning movement.

It will be understood that the invention is not to be limited to the specific construction or arrangement of parts shown, but that they may be widely modified within the invention defined by the claim.

What is claimed is:

In a stuffing box, the combination with a casing having a bore therein, a rod extending through said bore, packing material between said rod and the inner walls of said bore, a follower ring adjacent to said packing material and extending radially from said rod to the inner walls of said bore, a plurality of fastening means extending axially outward from the end of said casing, said casing being provided at its end with an annular recess of greater diameter than the casing bore, a gland having a bore of diameter smaller than said casing bore, a flange on said gland extending axially from the diameter of the gland bore to the diameter of said annular recess, said flange extending into said recess and said gland abutting the end of said casing at points immediately surrounding said fastening means when said gland is in assembled position, and a follower adjustably movable axially in the bore of said gland and contacting said follower ring.

WILLS M. FLEMING.